United States Patent [19]

Popper et al.

[11] 3,758,534

[45] Sept. 11, 1973

[54] PRODUCTION OF METAL CHELATES

[75] Inventors: Felix B. Popper; Albert H. Levesque, both of Nashua, N.H.

[73] Assignee: W. R. Grace & Co., New York, N.Y.

[22] Filed: Sept. 15, 1971

[21] Appl. No.: 180,836

Related U.S. Application Data

[60] Division of Ser. No. 81,177, Oct. 15, 1970, Pat. No. 3,644,444, which is a continuation-in-part of Ser. No. 740,488, June 27, 1968, abandoned.

[52] U.S. Cl............ 260/429 J, 260/429.9, 260/434, 260/435, 260/438.1, 260/438.5, 260/439 R, 260/447, 260/534 E
[51] Int. Cl.......................... C07f 3/00, C07f 15/00
[58] Field of Search ..................... 260/429 J, 429 R, 260/439 R, 429.9, 534 E, 438.1, 438.5

[56] References Cited
UNITED STATES PATENTS

| 2,945,881 | 7/1960 | Colman et al. | 260/534 E |
| 3,463,811 | 8/1969 | Godfrey et al. | 260/534 E |
| 2,407,645 | 9/1946 | Bersworth | 260/429 |
| 2,893,916 | 7/1959 | Rubin | 260/429 |

Primary Examiner—Daniel E. Wyman
Assistant Examiner—A. P. Demers
Attorney—Elton Fisher et al.

[57] ABSTRACT

An alkali metal salt of a polyvalent metal chelate of a chelating aminoacetic acid is formed by:

1. Boiling a mixture of; (a) water; (b) an amine precursor of the said acid; (c) formaldehyde; (d) a cyanide of the polyvalent metal; and (e) an alkali metal cyanide, and adding thereto the chelating aminoacetic acid in its free form to react with unreacted polyvalent metal cyanide 2. Boiling a mixture of; (a) water; (b) an amine precursor of the said acid; (c) formaldehyde; (d) a polyvalent metal hydroxide or oxide; (e) an an alkali metal hydroxide; and (f) hydrogen cyanide and adding thereto the chelating aminoacetic acid in its free form to react with unreacted polyvalent metal hydroxide or oxide.

7 Claims, No Drawings

PRODUCTION OF METAL CHELATES

CROSS REFERENCE TO RELATED APPLICATION

This is a divisional of application Ser. No. 81,177, filed Oct. 15, 1970, which is now U.S. Pat. No. 3,644,444 which was, in turn, a continuation-in-part of application Ser. No. 740,488, filed June 27, 1968, and now abandoned.

BACKGROUND OF THE INVENTION

This invention is in the field of chelating amino acids; more specifically, it is in the field of chelates of such acids with polyvalent metals.

Chelates of metals with chelating amino acids are taught by; (a) Frank J. Welcher, "The Analytical Use of Ethylenediamine Tetraacetic Acid", D. Van Nastrand Company, Inc., 1958, pp. 3–9; and (b) Anthony Standon, Executive Editor, "Kirk-Othmer Encyclopedia of Chemical Technology", Interscience Publishers, Division of John Wiley & Sons, Inc., Vol 6, 1965, pp. 1–24.

Chelates prepared by the process of this invention are useful in treating soil to supply water soluble trace metals (e.g., cobalt, copper, zinc, iron, and the like) to soil for agricultural purposes. These chelates are also useful to supply trace elements to animal feeds, and to supply water soluble metal ions (in chelated form) to plating baths.

SUMMARY OF THE INVENTION

In summary, this invention is directed to a process for forming an aqueous solution of an alkali metal salt of a polyvalent metal chelate of a chelating aminoacetic acid comprising:

a. forming a first system by admixing; (i) water; (ii) an amine precursor of the chelating aminoacetic acid; (iii) formaldehyde; (iv) an alkali metal hydroxide; (v) a cyanide of the polyvalent metal; and (vi) an alkali metal cyanide, the amine precursor of the chelating aminoacetic acid, the formaldehyde, the cyanide of the polyvalent metal, and the alkali metal hydroxide being supplied in amounts sufficient to form the alkali metal salt of the polyvalent metal chelate of the chelating aminoacetic acid;

b. maintaining the first system at about the boiling point of water to remove by-product ammonia and to form a second system; and c. adding the chelating aminoacetic acid in its free form to said second system to react with unreacted polyvalent metal cyanide.

DESCRIPTION OF PREFERRED EMBODIMENTS

In preferred embodiments of the process set forth in the above summary;

1. The amine precursor of the chelating amino acid, the formaldehyde, the cyanide of the polyvalent metal, and the alkali metal cyanide are admixed in an equivalent ratio of about 1:1–2.5:1–1.5:1–1.25 (preferably about 1:1–1.1:1–1.25:1–1.1), the water being supplied in such an amount that the final metal chelate solution has a metal chelate concentration of 25–50 percent (preferably 35–45 percent) and the alkali metal hydroxide being supplied in a mole ratio to the amine precursor of 0.1–1:1 (preferably 0–0.5:1).

2. The pH of the second system is adjusted to about 4–8 (preferably about 5–7) by adding the chelating aminoacetic acid in its free form thereto.

3. The polyvalent metal cyanide is zinc cyanide, cadmium cyanide, copper cyanide, calcium cyanide, or nickel cyanide.

4. The alkali metal hydroxide is sodium hydroxide or potassium hydroxide.

5. The alkali metal cyanide is sodium cyanide or potassium cyanide.

6. The amine precursor of the chelating aminoacetic acid is ethylenediamine, aminoethylethanolamine, diethylenetriamine, or monoethylanolamine.

7. The pH of the first system is about 9–14 (preferably about 10–12).

In another preferred embodiment (Embodiment A); this invention is directed to a process for forming an aqueous solution of an alkali metal salt of a polyvalent metal chelate of a chelating aminoacetic acid comprising:

a. forming a first system by admixing; (i) water; (ii) an amine precursor of the chelating aminoacetic acid; (iii) formaldehyde; (iv) a polyvalent metal base selected from the group consisting of a hydroxide or an oxide of said polyvalent metal; (v) an alkali metal hydroxide; and (vi) hydrogen cyanide, the amine precursor of the chelating aminoacetic acid, the formaldehyde, the polyvalent metal base, the alkali metal hydroxide, and the hydrogen cyanide being supplied in amounts sufficient to form said alkali metal salt of said polyvalent metal chelate of said chelating aminoacetic acid;

b. maintaining the first system at about the boiling point of water to remove by-product ammonia and to form a second system; and c. adding the chelating aminoacetic acid in its free form to the second system to react with unreacted polyvalent metal base and to adjust the pH of the second system to the level of the alkali metal salt of the polyvalent metal chelate of the chelating aminoacetic acid. In preferred embodiments of the process of Embodiment A, supra:

1. The amine precursor of the chelating amino acid, the formaldehyde, the polyvalent heavy metal base, and the hydrogen cyanide are admixed in an equivalent ratio of about 1:1–2.5:1–1.5:1–1.25 (preferably about 1:1–1.1:1–1.25:1–1.1), the water being supplied in such an amount that the final metal chelate solution has a metal chelate concentration of 25–50 percent (preferably 35–45 percent), and the alkali metal hydroxide is supplied in a mole ratio amine precursor of 0–1.1 (preferably 0–0.5:1).

2. The pH of the second system is adjusted to about 4–8 (preferably about 5–7) by adding the chelating aminoacetic acid in its free form thereto.

3. The polyvalent metal base is a hydroxide or oxide of mercury, lead, cadmium, bismuth, cobalt, nickel, manganese, chromium, calcium, magnesium, and barium.

4. The amine precursor of the chelating aminoacetic acid is ethylenediamine, aminoethylethanolamine, diethylenetriamine, or monoethylanolamine.

5. The alkali metal hydroxide is sodium hydroxide or potassium hydroxide.

6. The pH of the first system is about 9–14 (preferably about 10–12).

DETAILED DESCRIPTION OF THE INVENTION

The parent application, Ser. No. 740,488, discloses a process for preparing an alkali metal salt of a polyvalent metal chelate by reacting a nitrile of a precursor of a chelating amino acid with alkali and a polyvalent metal oxide or hydroxide in an amount sufficient to form the chelate, the reaction being conducted in an aqueous medium at about the boiling temperature of the system. We have now found that the nitrile can be replaced with formaldehyde, a cyanide source, and an amine precursor of the chelating amino acid where using the techniques set forth in the above summary or in Embodiment A, supra, to prepare the desired chelate.

We have also found that, where using the procedure set forth in the above summary, the polyvalent metal hydroxide or oxide can be replaced with a polyvalent metal cyanide where the polyvalent metal is zinc, cadmium, copper, calcium, or nickel.

In the embodiment of the instant invention set forth in the above summary (and the preferred embodiments thereunder) water, an amine precursor of the chelating aminoacetic acid, formaldehyde, a cyanide of a polyvalent metal, an alkali metal hydroxide, and an alkali metal cyanide are admixed in such amount as to provide at least stoichiometric quantities of the reactants (based on the amine) and sufficient water (part of which is added with the formaldehyde which is preferably supplied as a solution analyzing about 25–50 percent HCHO) to maintain the chelate product in solution at room temperature (ca. 15°–35°C.). Ratios of the other reactants (formaldehyde, alkali metal hydroxide, alkali metal cyanide, cyanide of the polyvalent metal) to the amine appreciably greater than those set forth in Preferred Embodiment No. 1 under said summary can be used, but no advantage is gained by so doing, and such excess quantities are costly and must generally be separated from the chelate product, thereby further increasing costs. Excess (unreacted) polyvalent metal cyanide can be chelated by adding the chelating aminoacetic acid in its free form.

Likewise, where using the process set forth in Embodiment A and the preferred embodiments thereunder at least stoichiometric quantities of the reactants (based on the amine precursor of the chelating aminoacetic acid) are used. While ratios of the other reactants (formaldehyde, polyvalent metal base, alkali metal hydroxide, and hydrogen cyanide) to the amine in excess of those set forth in Preferred Embodiment No. 1 under Embodiment A can be used, no advantage is gained by so doing, and such excess quantities of reactants are expensive and must generally be separated from the chelate product, thereby further increasing costs. Excess (unreacted) polyvalent metal base can be chelated by adding the chelating aminoacetic acid in its free form.

After preparing the chelate by the procedure described in the above summary (and the preferred embodiments thereunder) or by the procedure of Embodiment A (and the preferred embodiments thereunder) the product (which is substantially free of by-product ammonia) can, if desired, be bleached with hydrogen peroxide - preferably using a small quantity of an aqueous hydrogen peroxide solution analyzing about 20–50 percent $H_2O_2$.

If desired, the product solution can be clarified with charcoal or activated carbon and separated from insoluble residue (carbon plus colored bodies taken up by the carbon).

Before recovering the product solution it is tested for free (non-chelated) polyvalent metal ion. If such ion is present, it (the polyvalent metal ion) is chelated by the appropriate free chelating aminoacetic acid. Then, if required, the pH of the product solution can be readjusted to the appropriate level for the metal chelate (e.g., by adding the appropriate alkali metal hydroxide or the appropriate aminoacetic acid as required). Said pH (that of the alkali metal salt of the polyvalent metal chelate) can be readily determined (using pure materials and distilled water) by; (a) preparing the desired chelate from stoichiometric quantities of a salt, hydroxide, or oxide of the appropriate polyvalent metal ion, the appropriate chelating aminoacetic acid, and the appropriate alkali metal hydroxide; and (b) accurately measuring the pH of the resulting solution of the alkali metal salt of the polyvalent metal chelate.

If desired, the alkali metal salt of the polyvalent metal chelate can be recovered as a solid by evaporating water from the solution of said chelate to form a slurry of solid chelate in mother liquor, separating the solid chelate from the mother liquor, and recovering the separated chelate. In such instance the mother liquor can be recycled and used as a source of water where preparing a subsequent quantity (or batch) of said chelate by the process of the above summary or by the process of Embodiment A, supra.

The sodium slat of the calcium chelate with ethylenediaminetetraacetic acid (EDTA), shown below, is typical of the chelates formed by the process of this invention.

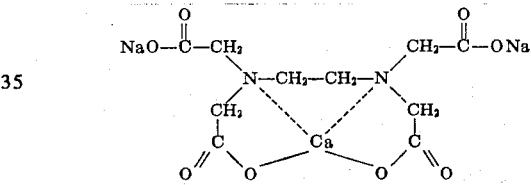

(Sodium Salt of Calcium Chelate with EDTA)

The instant invention will be better understood by referring to the following specific but nonlimiting examples. It is understood that; (a) said invention is not limited by these examples which are offered merely as illustrations; and (b) modifications can be made without departing from the spirit and scope of the invention.

EXAMPLE I

Sixty-one g of ethylenediamine and 90 ml of water were heated to 95°C. in a glass reactor vessel equipped with stirrer, heating mantle and dropping funnels. Then 286 g of 36 percent aqueous sodium cyanide solution, 19 g of 50 percent caustic soda solution and 125 g of solid zinc cyanide were added. The resulting mixture was heated again to 95°C., and 342 g of a 37 percent solution of aqueous formaldehyde was added over a ½ hour period, while stirring and maintaining the temperature at 95°–100°C.

At the end of the formaldehyde addition the product mixture was boiled with occasional addition of water to maintain the volume until all the ammonia formed had been expelled. The ammonia expelled during the reaction and during this boiling period was collected in acid. The quantity of ammonia collected in the acid corresponded to 68 percent of the theoretical quantity for the formation of the sodium salt of the zinc chelate with ethylenediaminetetraacetic acid (EDTANa₂Zn) solution.

The pH of the product mixture (the chelate product) was adjusted to 7.5 by adding free ethylenediaminetetraacetic acid (EDTA). A dark yellow solution resulted. A portion of this solution was acidified with hydrochloric acid to a pH of 1.4 and a precipitated identified as EDTA formed. This precipitate was collected, dried and weighed, it corresponded to a conversion of 66 percent of theory based on the ethylenediamine charged into the reaction vessel.

EXAMPLE II

A mixture of 99.0 g of ethylenediamine, 330.0 g of 50 percent caustic soda, 75.7 g of magnesium oxide and 330.0 g of water were heated to approximately 95°C. in an apparatus similar to the one described in Example I. While maintaining the temperature at about 95°C., 189 g of liquid hydrogen cyanide and 568.0 g of 37 percent formaldehyde were added over a 2 hour period at such rates that throughout the first 1-¾ hours of the run there was always a stoichiometric excess of hydrogen cyanide over formaldehyde. The ammonia formed was then boiled off over a 2-½ hour period and approximately 125 g EDTA as the free acid was added to reduce the pH to 6.5. The resulting product was a dark yellow clear solution.

Conversion was determined by acidifying the product solution (as in Example I), recovering, drying and weighing the precipitated EDTA. Conversion was 58 percent of theory based on the ethylenediamine charged.

EXAMPLE III

To 1,716 g of diethylenetriamine, 6,000 g of water, 926 g of calcium hydroxide and 1,982 g of 100 percent sodium hydroxide maintained at 95°C. were added 7,582 g of 37 percent formaldehyde and 2,200 g of liquid hydrogen cyanide over a two hour period. After removing the by-product ammonia by boiling, 125 g of diethylenetriaminepentaacetic acid was added to give a solution having a pH of 7.2. This solution consisted essentially of or comprised the sodium salt of the calcium chelate with diethylenetriaminepentaacetic acid (DTPANa₃Ca).

Conversion was 61 percent of theory as determined by the quantity of by-product ammonia formed.

The general procedure of Example III was used to prepare sodium salts of chelates of mercury, lead, cadmium, bismuth, cobalt, nickel, manganese, chromium, calcium, magnesium, and barium with ethylenediaminetetraacetic acid, aminoethylethanolaminetriacetic acid, diethylenetriaminepentaacetic acid, and monoethanolaminediacetic acid using the hydroxides and oxides of said metals. Conversions ranged from about 60–72 percent of theory. Potassium salts of such chelates have been prepared in similar conversions by substituting potassium hydroxide for sodium hydroxide.

The general procedure of Example I was used to prepare sodium salts of chelates of zinc, cadmium, copper, calcium, and nickel with the above-mentioned aminoacetic acids. Conversions were about 65–75 percent of theory. Potassium salts of such chelates have been prepared in similar yields by substituting potassium hydroxide for sodium hydroxide and potassium cyanide for sodium cyanide.

As used herein, the term "equivalent" as applied to an amine precursor of a chelating aminoacetic acid means that quantity of the amine which contains 1 g of hydrogen bonded to an amino nitrogen, thus; (a) an aquivalent of ethylenediamine is one-fourth of a mole of said ethylenediamine; (b) an equivalent of aminoethylethanolamine (2-[(2-aminoethyl)amino]-ethanol) is one-third of a mole of said aminoethylethanolamine; (c) an equivalent of diethylenetriamine (2,2'-diaminodiethylamine) is one-fifth of a mole of said diethylenetriamine; and (d) an equivalent of monoethylamine is one-half of a mole of said monoethylamine.

As used herein, an equivalent of formaldehyde is 1 mole of formaldehyde.

As used herein, an equivalent of an alkali metal cyanide is 1 mole (1 formula weight) of said cyanide, and an equivalent of hydrogen cyanide is 1 mole of HCN.

As used herein, an equivalent of a polyvalent metal cyanide is that quantity of the polyvalent metal cyanide which contains 1 equivalent (1 formula weight, 26 g) of cyanide (CN) group. Thus, an equivalent of calcium cyanide is one-half mole one-half formula weight) of calcium cyanide, an equivalent of copper (II) cyanide is one-half mole of copper (II) cyanide; and an oquivalent of zinc cyanide is one-half mole of zinc cyanide.

As used herein, an equivalent of an alkali metal hydroxide is 1 mole (1 formula weight) of said alkali metal hydroxide.

As used herein, an equivalent of a polyvalent metal oxide is that quantity of said metal oxide which contains 1 equivalent (8 g) of oxide oxygen. Thus, an equivalent of mercury (II) oxide is one-half mole (one-half formula weight) of said oxide, an equivalent of chromium (III) oxide is one-sixth of a mole of chromium (III) oxide, and an equivalent of lead (II) oxide is one-half mole of lead (II) oxide.

As used herein, an equivalent of polyvalent metal hydroxide is that quantity of said polyvalent metal hydroxide which contains 1 equivalent (17 grams) of hydroxyl (OH) group. Thus, an equivalent of manganese (II) hydroxide is one-half mole (one-half forumla weight) of said manganese (II) hydroxide, 1 equivalent of manganese (III) hydroxide is one-third mole of said manganese (III) hydroxide, and 1 equivalent of chromiun (III) hydroxide is one-third mole of said chromium (III) hydroxide.

The term "mole", is used herein, unless otherwise defined where used, has its generally accepted meaning, that is, a mole of a substane is a "gram molecular weight" or "gram formula weight" of said substance, a mole of a substance being that quantity of the substance which contains the same number of "molecules" of said substance as there are atoms in exactly 12 grams of pure $^{12}C$.

The term "percent", as used herein, unless otherwise defined where used, means parts per hundred by weight.

As used herein, a polyvalent metal means a metal having an oxidation number (oxidation state or "valence number") of at least +2 and an atomic number of at least 12.

The terms "polyvalent metal cyanide", "polyvalent metal hydroxide", and "polyvalent metal oxide" as used herein mean a cyanide, hydroxide, or oxide, respectively of a metal having an atomic an atomic number of at least 12 an oxidation state (oxidation number or "valence number") of at least +2. Typical of such cyanides are zinc cyanide, cadmium cyanide, copper cyanide, calcium cyanide, and nickel cyanide in which the metal ion has an oxidation number of at least +2. Typical of such hydroxide and oxides are hyroxides and oxides of mercury, lead, cadmium, bismuth, cobalt, nickel manganese, chromium, calcium, magnesium, and barium in which the metal ion has an oxidation state of at least +2.

The term "conversion" as used herein means one pass yield.

The term "g" as used herein means gram or grams.

The term "formula weight" as used herein, unless otherwise defined where used, means gram formula weight (i.e., a formula weight in grams).

As used herein, unless otherwise defined where used, the term "boiling point of water" means the boiling point of water at about normal atmospheric pressure. At sea level such pressure is about 760 millimeters of mercury; such pressure is somewhat less than 760 millimeters at locations (e.g., Chicago, Pittsburgh, Salt Lake City, or Denver) which are substantially above sea level.

We claim:

1. A process for forming an aqueous solution of an alkali metal salt of a polyvalent metal chelate of a chelating aminoacetic acid selected from the group consisting of ethylenediaminetetraacetic acid, diethylenetriaminepentaacetic acid, aminoethanolaminetriacetic acid, and monoethanolaminediacetic acid, the polyvalent metal being selected from the group consisting of mercury, lead, cadmium, bismuth, cobalt, nickel, iron, copper, zinc, calcium, magnesium, barium, manganese (II), and chromium (III), the process comprising:
   a. admixing; (i) water; (ii) an amine precursor of the chelating aminoacetic acid; (iii) formaldehyde; (iv) a polyvalent metal base selected from the group consisting of a hydroxide or an oxide of said polyvalent metal; (v) an alkali metal hydroxide; and (vi) hydrogen cyanide, the amine precursor of the chelating aminoacetic acid, the formaldehyde, the polyvalent metal base, the alkali metal hydroxide, and the hydrogen cyanide being supplied in amounts sufficient to form said alkali metal salt of said polyvalent metal chelate of said chelating aminoacetic acid, and maintaining the resulting mixture at about the boiling point of water to remove by-product ammonia therefrom and to form said aqueous solution of alkali metal salt of said polyvalent metal chelate; and
   b. adding the chelating aminoacetic acid in its free form to said aqueous solution to react with unreacted polyvalent metal base present in said aqueous solution of alkali metal salt of polyvalent metal chelate.

2. The process of claim 1 in which the amine precursor of the chelating amino acid, the formaldehyde, the polyvalent metal base, and the hydrogen cyanide are admixed in an equivalent ratio of about 1:1–2.5:1–1.5:1–1.25, and the water is supplied in such an amount that the concentration of said alkali metal salt of said polyvalent metal chelate in said aqueous solution is about 25–50 percent.

3. The process of claim 1 in which the chelating aminoacetic acid in its free form is added in an amount to adjust the pH of said aqueous solution of said alkali metal salt of said polyvalent metal chelate of said chelating aminoacetic acid to about 4–8.

4. The process of claim 1 in which the polyvalent metal base is a hydroxide or oxide of calcium or magnesium.

5. The process of claim 1 in which the polyvalent base is a hydroxide or oxide of zinc.

6. The process of claim 1 in which the alkali metal hydroxide is sodium hydroxide or potassium hydroxide.

7. The process of claim 1 in which the pH of said resulting mixture is about 9–14.

* * * * *